United States Patent [19]
Lee et al.

[11] Patent Number: 6,140,925
[45] Date of Patent: Oct. 31, 2000

[54] MAGNETICALLY ACTUATED FLOAT SWITCH

[75] Inventors: Rory G. Lee; Alan J. Bergum, both of Detroit Lakes, Minn.

[73] Assignee: S. J. Electro Systems, Inc., Detroit Lakes, Minn.

[21] Appl. No.: 09/272,438

[22] Filed: Mar. 19, 1999

[51] Int. Cl.[7] .................................................. G08B 21/00
[52] U.S. Cl. .......................... 340/618; 340/623; 340/624; 73/305
[58] Field of Search ..................................... 340/612, 618, 340/623, 624; 73/305, 306, 307

[56] References Cited

U.S. PATENT DOCUMENTS

| | | | |
|---|---|---|---|
| 3,242,474 | 3/1966 | Gast et al. | 340/618 |
| 3,750,124 | 7/1973 | Barnes et al. | 340/623 |
| 5,621,393 | 4/1997 | Urich | 340/616 |

*Primary Examiner*—Edward Lefkowitz
*Attorney, Agent, or Firm*—Vidas, Arrett & Steinkraus, P.A.

[57] ABSTRACT

A magnetically actuated float switch for turning on and off an electrical load device which includes a mounting member, a moveable bracket member which is attached to the mounting member and which is moveable between a first bracket position and a second bracket position by an external force. The moveable bracket member further has a first magnetic end and a second magnetic end which define a space therebetween. The first magnetic end and second magnetic end are oriented in a repelling arrangement. Insertion of a magnet in the space between the magnetic ends of the bracket results in the moveable bracket being moved from the first position to the second position. The moveable bracket member is operatively arranged to change the state of a switch between a first and second state. The switch is in turn operably arranged to change the state of an electrical load device between an on state and an off state.

60 Claims, 7 Drawing Sheets

MAGNETICALLY ACTUATED FLOAT SWITCH

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The present invention relates to a magnetically actuated float switch which is actuated in response to a changing fluid level, particularly a magnetically actuated float switch which utilizes a float rod magnet that may be interposed between two repellingly arranged magnetic bodies and the resulting magnetic interaction results in the actuation of a switch. The present magnetically actuated float switch is capable of being operably connected to a electric load device such as a pump.

Liquid level sensing float switches have been in use for some time. These switches have been commonly used in conjunction with pumps or other electrical load devices, such as alarms, solenoid valves, semiconductor devices and the like. When used in connection with pumps, the switches are typically used to detect a desired liquid level, and when the desired level is reached or exceeded the switch actuates and subsequently activates the pump, which functions to displace the liquid until the level falls below the desired level. In such embodiments the liquid level is typically detected by a float which is freely moveable about and along a support member or rod, with the float controlling the actuation of a switch element as it moves up and down vertically along the float rod in response to the liquid level. When liquid level rises above a set point the switch will actuate in a first manner, and when the liquid level falls below a set point the switch will actuate in a second manner.

It will be appreciated by those skilled in the art that a wide variety of float switches exist, and that numerous float switches employ magnets. It will also be appreciated that known float switches often have multiple and differing functions.

U.S. Pat. No. 4,836,239 to Kinkead entitled "Water Cooling Tower And Water Level Control System Therefor" employs two magnets which are oriented in a repelling arrangement so that a substantial additional force is required to move the distal end of a lever arm. This type of arrangement does not provide a uniform switching action which is reliable for many cycles.

U.S. Pat. No. 4,943,210 to Bailey, Jr. et al entitled "Pump Control System, Level Sensor Switch and Switch Housing" utilizes a fluid pump, a partially hollow cylindrical float buoy which is disposed about a stem, and a reed switch. The stem is conductively connected to a pump. Within the stem, at a predetermined level is a normally open reed switch. Within the float buoy is a ring shaped magnet that surrounds the stem. As the float buoy rises with the liquid level, the magnetic nature of the ring magnet causes the reeds in the switch to be repelled away from the magnet thus forcing the reeds together. The mutual contact of the reeds closes the switch and activates a timer. This type of arrangement does not provide a uniform switching action and is not well suited to high vibration pump applications.

Another example of a float switch using magnets is U.S. Pat. No. 5,030,803 to Yarbrough, entitled "Offset Float Switch". Yarbrough provides for a switch that may be actuated by two floats, within the floats are switching magnets which allow the switch to be actuated when fluid level drops to a first level and actuated to a second position when the liquid rises to a second level which is above the first level. Like Bailey Jr. et al., Yarbrough utilizes a central stem with the floats disposed thereabout, and a reed switch within the stem. This type of arrangement does not provide a uniform switching action and is not well suited to high vibration pump applications.

U.S. Pat. No. 5,141,404 to Newcomer et al, entitled "Pump Apparatus" utilizes magnets arranged in a repelling arrangement to actuate a pump. The arrangement disclosed here does not provide a uniform switching action.

U.S. Pat. No. 5,562,422 to Ganzon et al, entitled "Liquid Level Control Assembly For Pumps" is directed to apparatus which uses magnets in an attracting arrangement to actuate a pump. The arrangement disclosed here does not provide a uniform switching action.

In light of the shortcomings described above what is needed is a switch which is magnetically actuated, reliable for many cycles and which provides a more uniform and consistent switching action.

It is a further goal to provide a magnetically actuated float switch to be utilized separately or within the existing housing of an electrical load device such as a pump.

BRIEF SUMMARY OF THE INVENTION:

With the above mentioned shortcomings and inventive goals in mind, the present invention provides for a magnetically actuated float switch for turning on and off an electrical load device which utilizes both an attracting force and a repelling force, which cumulatively provide the force necessary to actuate the switch. Purely repelling magnetic arrangements are more prone to fail to activate. Purely attracting magnetic arrangements are more prone to fail to deactivate. By utilizing both repelling and attracting magnetic forces, applicants have provided a switch which is more uniform and consistent, so that the system can be tuned or configured to more reliably activate and deactivate as compared to the prior art. This is done with a bracket having magnetic ends which are arranged in a repelling arrangement. A float rod magnet is carried by a float rod which is arranged so that it moves vertically upwardly and downwardly, such that when the liquid rises over a predetermined level, the float rod magnet will magnetically interact with the two magnetic ends of the bracket, the float rod magnet being repelled by one end and attracted by the other, so that a more uniform and consistent force is created which causes the switching action. As the float rod magnet is rising, it will initially be repelled downward by the closest magnetic end of the bracket. This creates a translational resistance which provides an equivalent downward force on the float, thereby storing potential energy in the float. When the liquid level is high enough to overcome this downward force, the float rod magnet will be catapulted upwardly in between the two magnetic ends of the bracket, which transfers the potential energy stored in the float into kinetic energy creating a horizontal snap action switching action of the bracket which provides more switching force at the beginning of the switching movement. During travel, the repelling force decreases and the attracting force increases providing a more uniform cumulative force throughout the travel. The greater force at the end of the switching action is desirable since the electrical load device will remain on until the liquid level falls below a certain level. The greater switching force provided by using both repelling and attracting forces allows for smaller magnets to be utilized, and also makes the float switch well suited for high vibration applications, such as application in which a pump creates a lot of vibration which can cause premature failure. Another advantage of the inventive arrangement is that the amount of energy necessary to force the float rod magnet in between the two magnetic ends of the bracket will always be great enough to ensure the full range of movement of the switch. The inventive switch arrangement will always actuate all the way once the switch starts moving.

The inventive float switch provides for a control apparatus which is made up of a mounting member, a moveable bracket member attached to the mounting member which is moveable between a first bracket position (FBP) and a second bracket position (SBP) by application of an external force, and a switch. The bracket member has two ends, each of which has magnetic characteristics. The bracket ends are oriented in a repelling arrangement. The bracket is operatively connected to a switch, such that when the bracket is in the FBP the switch will typically be in it off state and when the bracket is in its SBP the switch will be in its on state. The control apparatus, through the switch is connected to an electrical load device such as a pump.

The switch utilized in the control apparatus is of a common design and is typically a microswitch, also known in the art as a precision snap-action switch. The X3M302K2AA switch sold by Burgess SAIA, Inc. Of Buffalo Grove, Ill. 60089 is utilized in the preferred embodiment, however many other switches could be utilized if desired. As previously stated, the microswitch may be configured (wired) so that the normal state of the switch is the off state so that when the bracket is moved to the SBP the switch is turned to its on state. This configuration is generally the default setup for most float switches and is useful for pump-down applications as are well known in the art. However, the microswitch may also be wired to provide for the ability to have the normal or first state to be the on state and the second state to be the off state. Such a configuration is useful for pump-up applications, which are equally known of in the art.

Also the microswitch will normally have an actuating member which is biased by a biasing member. The biasing member acts to force the actuating member against the bracket to hold the bracket in its first position. The force applied to move the bracket to its second position must be sufficient to overcome the biasing force to depress the actuating member into its second position in order to turn the switch to its closed or on state. When the force is removed from the bracket, the biasing force will cause the actuating member and bracket to return to their first states, thus turning the switch back to its off or open state.

The force required for moving the bracket from the first position to the second position is supplied by a float rod magnet which is positioned so that it magnetically interacts with the opposingly oriented magnetic bracket ends. When the float rod magnet is inserted it results in two magnetic interactions, a repelling force and an attracting force, which combine to provide a force in a single direction which is sufficient to overcome the biasing force provided by the biasing member and to move the bracket from its first position to its second position. This force is sufficient to hold the bracket in the second position, thus keeping the switch and electrical load device in their on positions until the float rod magnet is removed.

The float rod magnet is brought into the necessary proximity of the bracket members as a result of its position atop a vertically mounted float rod. The float rod will move into the control apparatus through a float tower as a result of a float forcibly engaging an upper float stop located along the length of the float rod. The float will engage the upper float stop when the fluid exceeds a first predetermined level. When the level of fluid drops below the first predetermined level the float will no longer engage the upper float stop but, due to the increased amount of force provided by the combined magnetic interactions described above the bracket will remain in its second position. Only after the liquid drops below a second predetermined level and the float rests upon a lower float stop will the float rod magnet be forced to drop away from the bracket ends. This is due to the weight of the float against the lower float stop overcoming the magnetic forces at play.

The strength of the biasing force as well as the magnetic forces, as described above, result in the bracket moving from either the first or second position to the other position with a snap-action.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
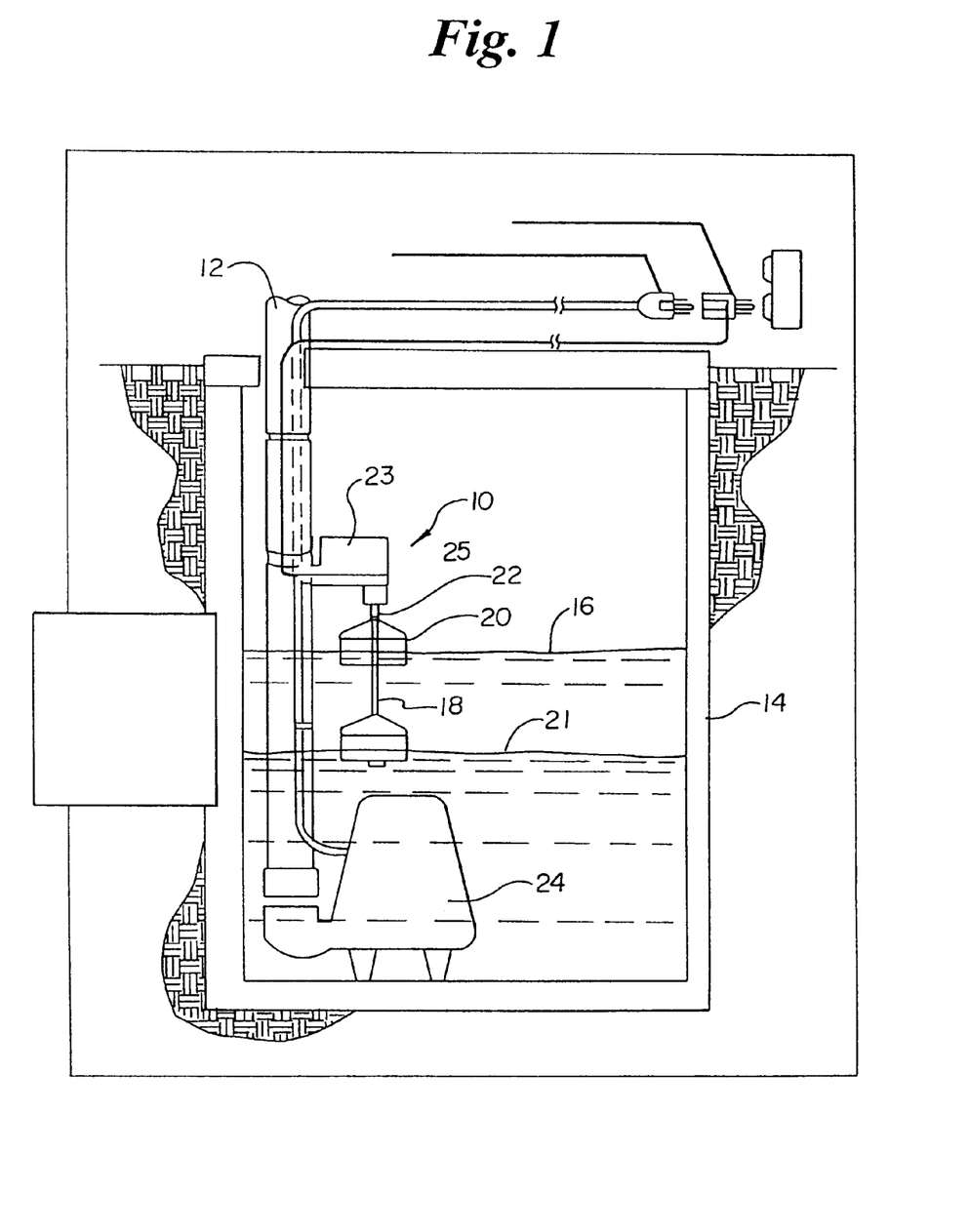
FIG. 1 is a side perspective view of the inventive magnetically actuated float pump in a pump-down sump pump application.

FIG. 1 shows the inventive magnetically actuated float switch, shown generally at 10, which is secured to a discharge pipe 12 for maintaining the level of a liquid in a sump 14 below a predetermined level 16. Float switch 10 includes a float rod 18 and a float 20. As the liquid level in sump 14 rises, the float 20 moves vertically along float rod 18 from liquid level 21 to liquid level 16, until it engages the float rod magnet carrier 22, causing it to rise vertically until the float switch is actuated turning the pump 24 on to lower the liquid level. The internal switching mechanism is sealed inside enclosure 23, which is ultrasonically welded to base 25. Although the preferred embodiment will be described in connection with a pump-down application, it should be understood that the inventive float switch could be used to switch on and off any electrical load device, such as an alarm, to actuate a solenoid valve or any other desired application. The float 20 may be any standard float, such as a solid member formed of light weight material having a density less than the fluid to be pumped, or an open bottom float, which are both well known in the art. It should also be understood that the inventive magnetically actuated float switch can be used in connection with any liquid, but is described below in connection with water or sewage.

Figure 2:
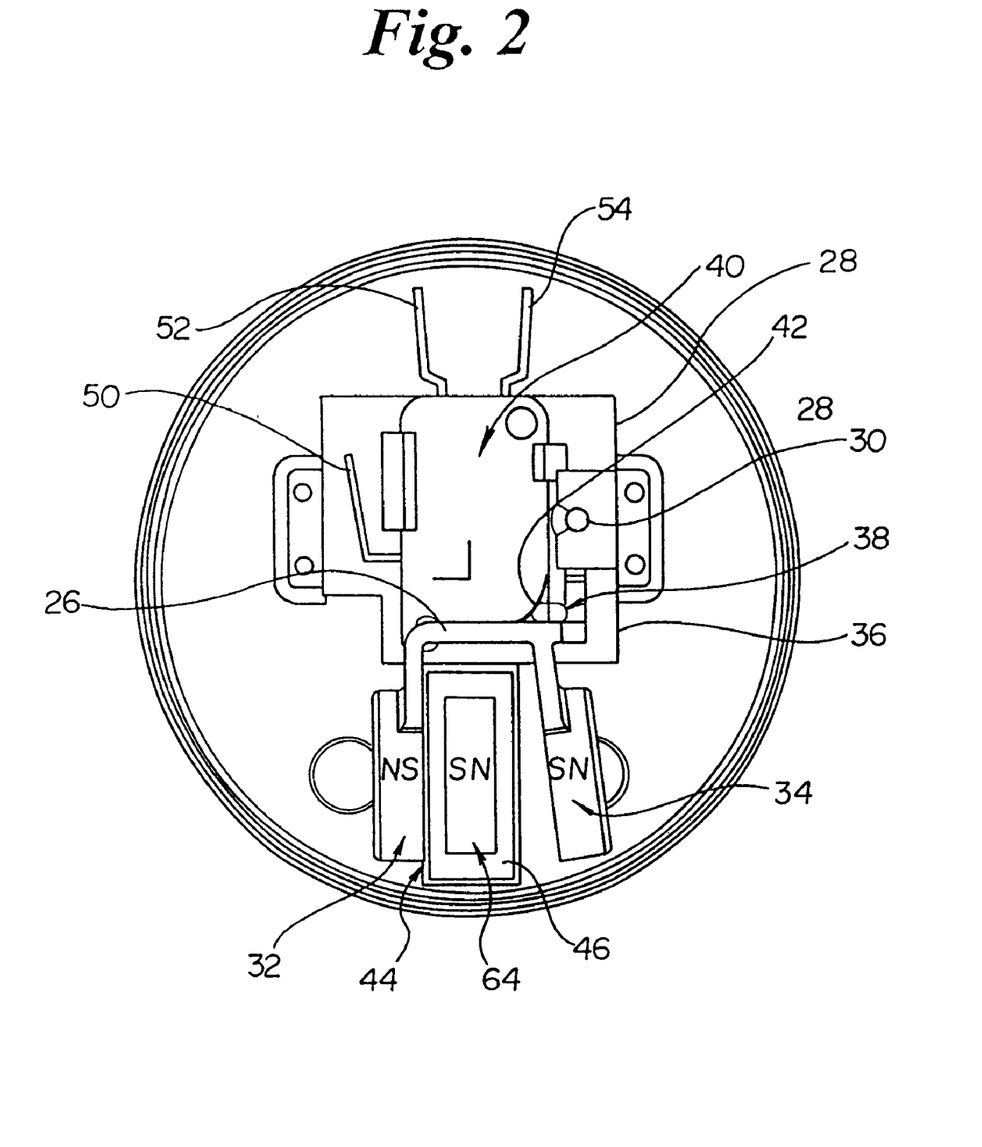
FIG. 2 is a top view of the inventive float switch showing the bracket in its first or open position.
Figure 3:
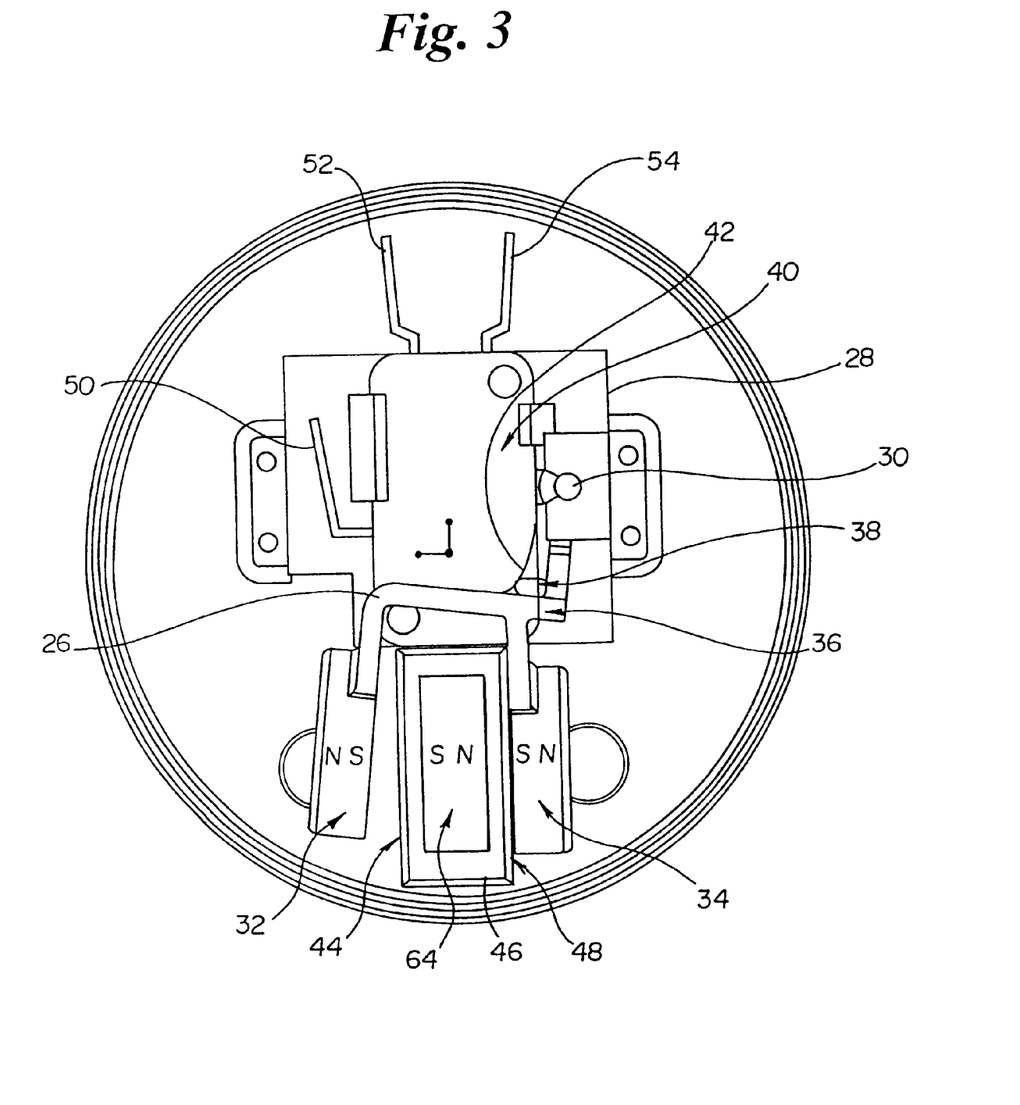
FIG. 3 is a top view of the inventive float switch showing the bracket in its second or closed position.
Figure 4:
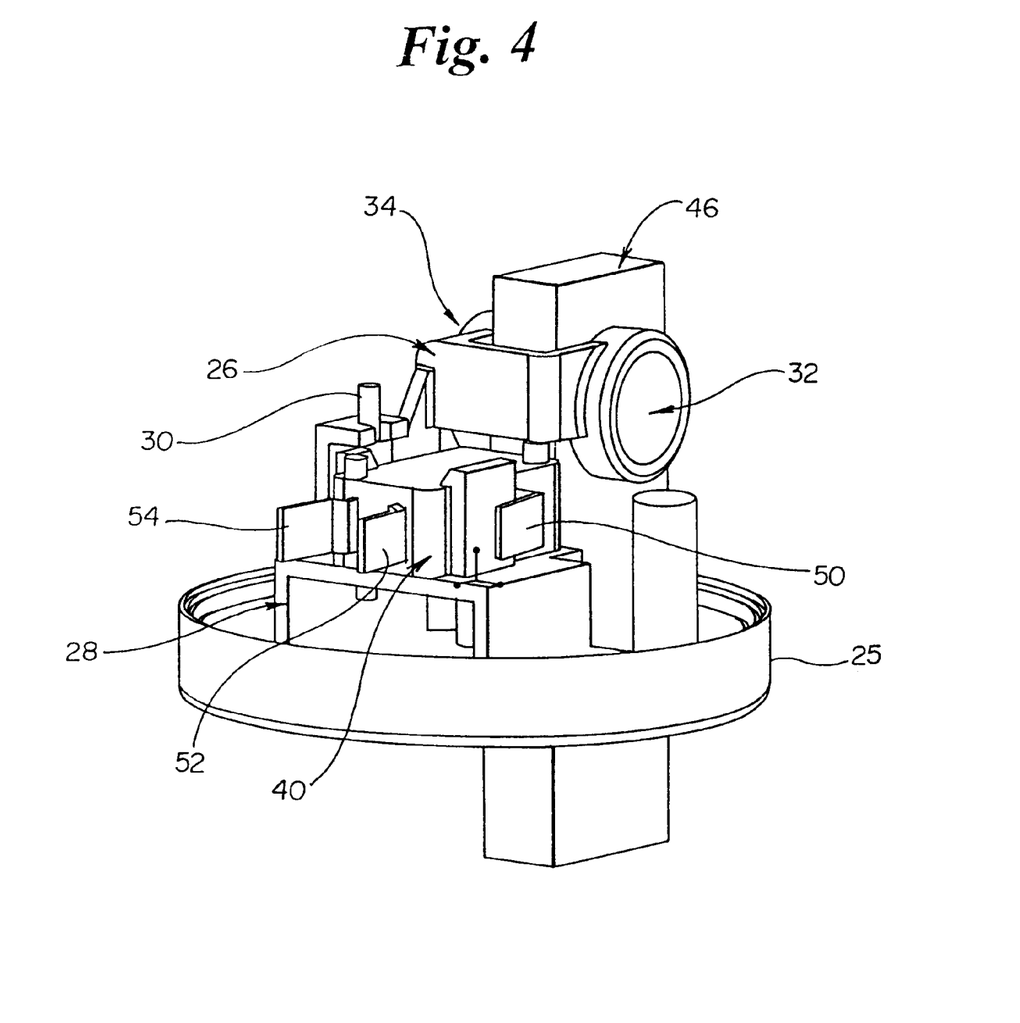
FIG. 4 is perspective view of the inventive float switch.
Figure 5:
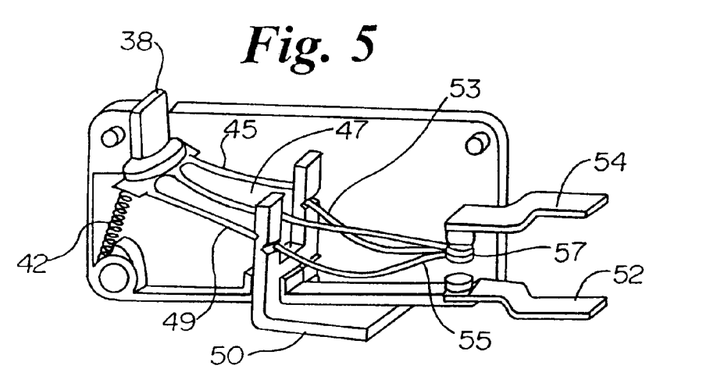
FIG. 5 is a perspective view of the switch internal mechanism.
Figure 6:
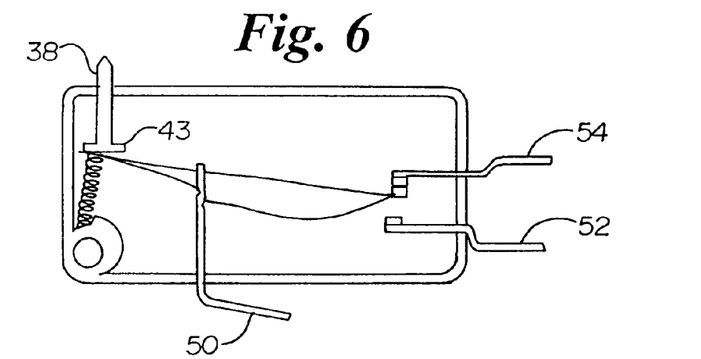
FIG. 6 is a top view of the switch.
Figure 7:
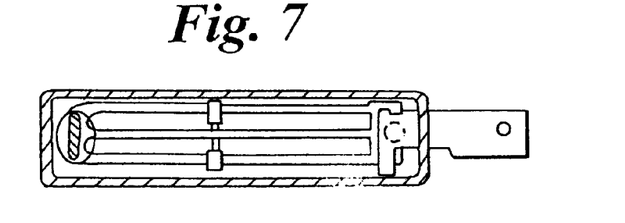
FIG. 7 is a side view of the switch.

FIGS. 2, 3 and 4, show the various exposed components of the inventive magnetically actuated float switch 10. The moveable bracket member 26 is shown pivotally mounted to the mounting member 28 at a pivot pin 30. The moveable bracket member 26 may either snap fit to pivot pin 30 or may be arranged to lower it onto pivot pin 30. In the referred embodiment, mounting member 28, moveable bracket member 26 and pivot pin 30 are made of molded plastic, although they may be made of any desired material. The moveable bracket member 26 has a first magnetic end 32, a second magnetic end 34 and a lever arm 36 which rests against an actuating member 38. The actuating member 38 is operatively connected to the precision microswitch 40. The microswitch 40 may be toggled between its two states by depressing the actuating member 38 from its normally open first osition to its depressed second position. In the preferred embodiment, microswitch 40 is electrically configured so that it has a normally open contact arrangement (discussed further below in connection with FIG. 9).

Figure 8:
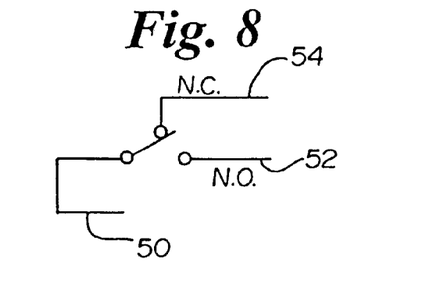
FIG. 8 is an electrical schematic of the switch.

Referring now to FIGS. 5–8, the microswitch 40 is shown in more detail where it can be seen that biasing element 42 maintains actuating member 38 in a normally open position. When actuating member 38 is depressed, its base section 43 applies tension to switch elements 45, 47 and 49. The tension applied to center element 47 is enough to overcome the force of curved elements 53 and 55, which causes the switch contact 57 to move against contact 52. When the actuating member 38 is released biasing element or spring 42 pushes against actuating member 38 causing switch contact 57 to move against contact 54. FIG. 8 shows the electrical schematic showing contact 50 switching between contact 52 and 54.

Figure 9:
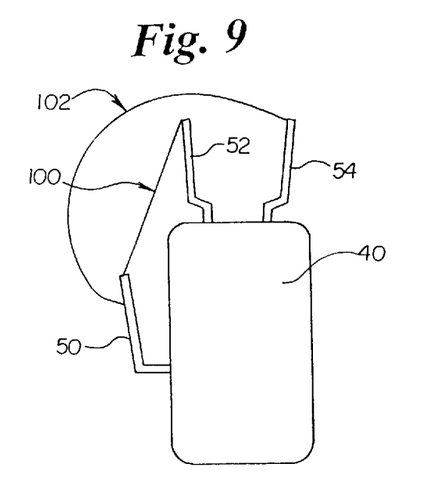
FIG. 9 is a top down view of the microswitch showing the alternative normally open contact arrangement and a normally closed contact arrangement.

As shown in FIG. 9, when common contact 50 is electrically connected to contact 52, as indicated by line 100, the microswitch operates with a normally open contact arrangement so that the electrical load device is off unless the microswitch 40 is put into its second state by depressing actuating member 38. A normally open contact arrangement is widely used in applications such as pump-down sump pumps. Although not discussed in detail herein, the microswitch 40 may also alternatively have contact 50 electrically connected to contact 54, as indicated by line 102, which configures the microswitch to a normally closed contact arrangement, so that the electrical load device is on unless the microswitch 40 is put into its second state by depressing actuating member 38. A normally closed contact arrangement is widely used in applications such as pump-up applications.

As shown in FIGS. 2 and 5–7, the actuating member 38 is normally maintained in the fully extended first position through the application of a biasing force supplied by a biasing element 42. When the actuating member 38 is fully extended in this manner the switch 40 is generally in its off state. The biasing force supplied by the biasing element 42 against the actuating member 38 and transferred to the lever arm 36 is sufficient to push the moveable bracket member 26 counter-clockwise around the pivot point 30. The extent of this motion is limited by the presence of the first outside wall 44 of the float rod tower 46 against the first magnetic end 32 of the moveable bracket member 26. When the first magnetic end 32 rests against the first outside wall 44 the moveable bracket member is defined as being in its first or open position.

The float switch is shown in its second state in FIG. 3, in which bracket 26 has been rotated by an external force, discussed in more detail further below, to its second or closed position, in which second outside wall 48 of the float rod tower 46 abuts inside surface 51 of the magnetic end 34. The float rod, which carries the float rod magnet 64 will be discussed in greater detail below. However, the float rod magnet 64 as shown in FIG. 2 is far enough below the magnetic ends 32 and 34 so that it does not magnetically interact with them. In FIG. 3, the liquid level has raised the float rod magnet 64 enough to magnetically interact with magnetic ends 32 and 34, causing the bracket 26 to rotate to its closed position. When the bracket 26 rotates, lever arm 36 supplies enough force on actuating member 38 to overcome the biasing force of biasing element 42.

Figure 10:
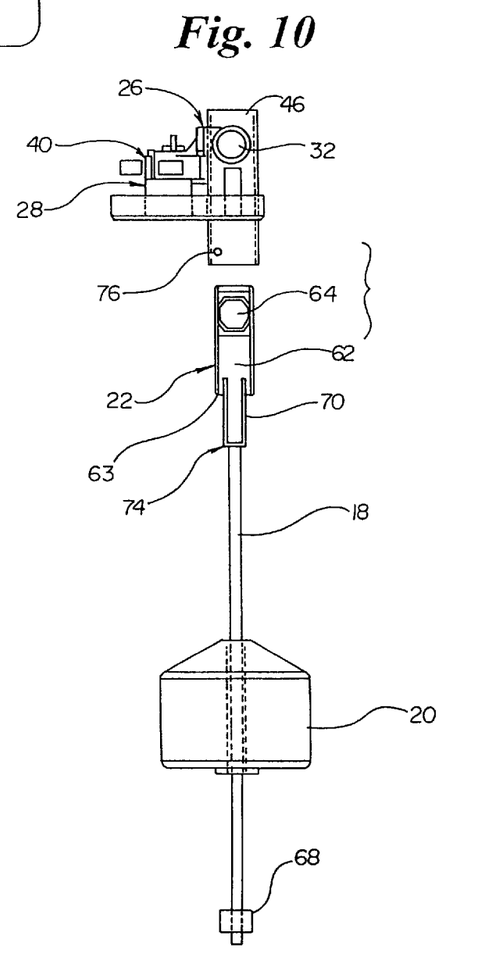
FIG. 10 is a partially exploded side view showing the float rod and float rod pin removed from the float rod tower.

Referring now to FIG. 10, float rod 18 is shown before assembly with float rod tower 46. Attached to the top of float rod 18 is float rod magnet carrier 22 which carries float rod magnet 64. As can be seen best in FIGS. 2 and 3, magnetic end 32 is in an repelling arrangement with magnet 64, and magnetic end 34 is in an attracting arrangement with magnet 64. This also results in magnetic ends 32 and 34 being arranged in a repelling fashion. This arrangement, which utilizes both an attracting force and a repelling force, acting in the same direction, has been found to have several advantages over the prior art.

Figure 11:
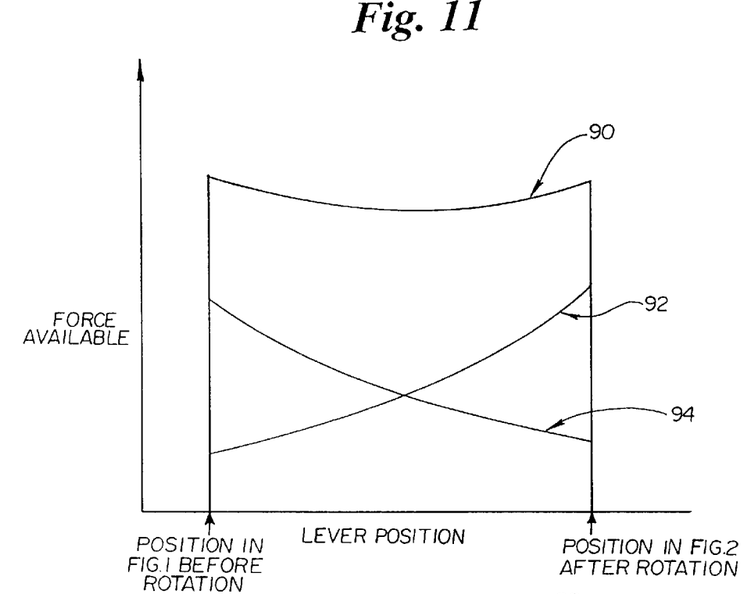
FIG. 11 is a chart which represents the comparative strengths of the magnetically actuated float switch including the singular and cumulative effects of a repelling magnet force and an attracting magnet force on a third magnetic body.

The graph shown in FIG. 11 shows the sum 90 of both the attracting 92 and repelling 94 forces between magnetic ends 32, 34 and float rod magnet 64. Because the strength of each magnetic interaction varies based on the distance between each magnet involved, the sum of both the attracting and repelling forces tends to provide a more uniform and even force being applied to the bracket 26 to move it from its open to its closed position. The interactions between magnetic ends 32, 34 and the float rod magnet 64 also repel the float rod magnet as it rises, which creates a resistance which provides a downward force on the float. When the liquid level is high enough to overcome this downward force, the float od magnet will be catapulted upwardly in between the two magnetic ends of the bracket, creating a snap action switching action which provides more switching force at the beginning and at the end of the switching action, and more uniform force in between. The greater switching force provided by using both repelling and attracting forces allows smaller magnets to be utilized, and also makes the float switch well suited for high vibration applications, such as application in which a pump creates a lot of vibration which can prematurely deactuate the switch. Also, by combining the attracting and repelling forces a greater force is achieved than by using a single magnetic end on the bracket 26.

Furthermore, acceleration as magnetic end 34 and float rod magnet 64 move so that inside surface 51 abuts outside surface 48 of the float rod tower 46 gives the bracket 26 a "snapaction" which has been found to be desirable.

Referring again to FIG. 10, this magnetic arrangement also conveniently keeps the switch in its closed or on state until the float rod magnet 64 has been lowered by a lower liquid level enough so that the float 20, places enough weight on the lower float rod stop 68 to overcome the attracting force between magnetic end 34 and float rod magnet 64. Once the liquid level is low enough to place enough weight on stop 68, the float rod 18 will lower vertically so that float rod magnet 64 no longer magnetically interacts with magnetic ends 32 or 34. Float 20 is arranged around float rod 18 and moves upwardly and downwardly on float rod 18 between an upper float stop 74 and a lower float rod stop 68.

Figure 12:
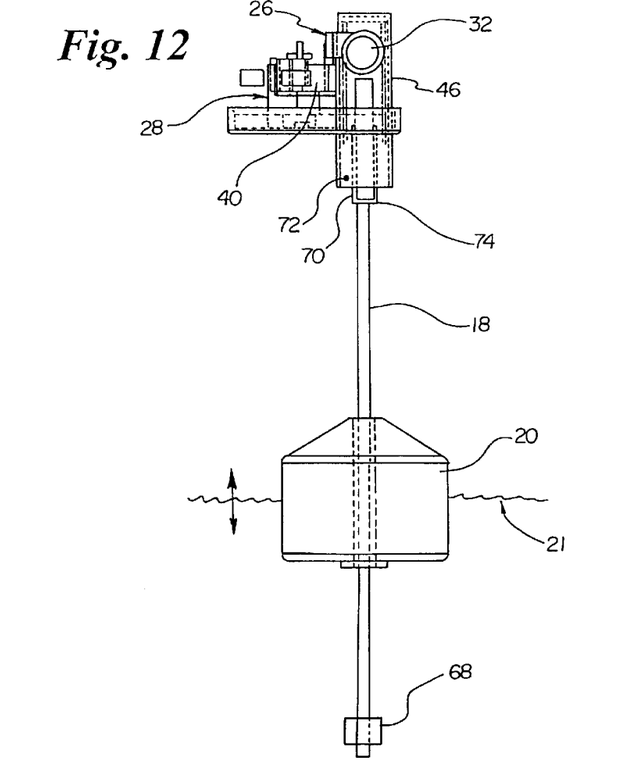
FIG. 12 is the same view as shown in FIG. 10 showing the float rod supported by the float rod pin within the float rod tower.

The float rod magnet carrier 22 has an upper portion sized to fit within float rod tower 46, and a narrower lower portion 70 which extends out of the open bottom of float rod tower 46, as best seen in FIG. 12. A removable pin 72 forms a barrier which prevents the wider upper portion of 62, or shoulder 63, from lowering below pin 72. Thus the float rod magnet carrier 22 is confined to a range of motion between pin 72 and the closed top of float rod tower 46. The range of motion may altered by changing the height of the float rod tower 46. Also, the bottom of lower portion 70 forms an upper float stop 74, which is engaged by the float 20 to raise float rod magnet carrier 22 as the liquid level rises. It should be understood that many arrangements for confining carrier 22 inside the float tower 46, such as for example replacing the pin 72 with a partial bottom on the float tower 46. To assemble the float switch 10, the carrier 22 is inserted into float rod tower 46 and pin 72 is inserted into hole 76. This is shown in FIG. 10 and FIG. 12.

As shown in FIGS. 10 and 12, the upper float stop 74 is seen as a molded extension of the lower portion 70 of carrier 22. In contrast, lower float stop 68 is shown as a cylindrical body or grommet which frictionally fits around float rod 18, and if desirable may be adjustable by sliding to a new position. It should be understood that the float stops 68 and 74 may be embodied in different forms wherein the stops 68 and 74 may either be fixed or alternatively moveable along the float rod 18 so that the range of motion of the float 20 between the two float stops 68 and 74 may be varied. Moveable stops are well known within the art and may include but are not limited to devices such as clips, tabs, grommets, etc.

It should be understood that although the inventive float switch has been discussed in connection with a float switch which is separate from the electrical load device, such as a pump 24, the mounting member 28, bracket 26 and microswitch 40 could be easily incorporated into a housing of the electrical load device, such as a pump.

Method of Operation

In a pump-down operation, as the liquid level rises and falls the float 20 moves upwardly and downwardly along float rod 18. As the fluid level rises the float 20 will rise with it. If the fluid level is sufficient, such as the level shown at 16 in FIG. 1, the float 20 will engage the upper float stop 74. As the fluid level 16 continues to rise, the float 20 will cause the float rod 18 and therefore float rod magnet carrier 22 to rise vertically within the float rod tower 46. The carrier 22 will continue to rise with the float 20 and fluid level 16 until the carrier 22 abuts the closed top portion of the float rod tower 46.

As discussed above, the float rod magnet 64 is carried by the float rod magnet carrier 22. As a result of the float rod 18 rising to the top of the float rod tower 46, the float rod magnet 64 will magnetically interact with the repellingly arranged magnetic ends 32 and 34, in the manner shown by FIG. 3. This magnetic interaction causes one of the poles of the loat rod magnet 64 to be attracted to the magnetic pole of the bracket end which opposes it, shown here as 34. Simultaneously, the remaining pole of the float rod magnet 64 will be epulsed by the like pole of the remaining bracket end 32.

The combined repelling and attracting magnetic fields create a combination force sufficient to overcome the biasing force supplied by biasing element 42 against the actuating member 38. As a result, the bracket member 26 is moved from the normally first or open position shown in FIG. 2 to the second or closed position shown in FIG. 3, thus depressing the actuating member 38 and placing the microswitch 40 into the open or on state, which turns on the pump 24.

The magnetic interactions between the bracket ends 32 and 34, and the float rod magnet 64 are sufficient to keep the float rod 18 in its raised position despite the initial lowering and disengaging of the float 20 from the upper float stop 74, as the liquid level lowers. Therefore, the pump will remain on until the float rod magnet 64 is magnetically disengaged from bracket ends 32 and 34, as discussed further below.

As the fluid level continues to drop, the float 20 will eventually encounter the lower float stop 68. With a continued drop in the liquid level the weight of the float 20 pressing on the lower float stop 68 will be sufficient to overcome the magnetic interactions described above and force the carrier 22 to descend inside the float rod tower 46 until the shoulder 63 abuts or rests on pin 72 within the float rod tower 46.

Upon removal of the float rod magnet 64 from between the bracket ends 32 and 34, the force exerted by the biasing member 42 is sufficient to force the actuating member 38 back to its first fully extended or closed position. The force supplied by the biasing element 42 to the actuating member 38 is in turn transferred to the lever arm 36. As a result, the lever arm 36 is pushed away from the microswitch 40 resulting in the bracket moving from the second position back to the original first position with a rapid snap-action.

As a result of the actuating member 38 being returned to its extended state, the microswitch 40 will be turned back to the normally first or 'off' state, as will the pump or other electrical load device 24 which is operably connected to the magnetically actuated float switch.

It should be understood that the described operation could be utilized in a pump-up application simply by electrically connecting 50 and 54 instead of contacts 50 and 52, such that the pump 24 is normally on and is turned off when the microswitch is actuated by float 20.

While the above magnetically actuated float switch has many uses and mbodiments, the preferred use is to act as an operating means for a pump or other fluid controlling device. Some examples of other uses for the present magnetically actuated float switch include using the float switch to trigger a warning alarm or signaling means, or as a means for operating a regulatory valve, or seal. The components of the present magnetically actuated float switch may also vary depending on the use. For instance when used in water the float may be configured with different weight and buoyancy characteristics as opposed to when used in oil or other heavy fluids.

This completes the description of the preferred and alternate embodiments of the invention. Those skilled in the art may recognize other equivalents to the specific embodiment described herein which equivalents are intended to be encompassed by the claims attached hereto.

What is claimed is:

1. A control apparatus for turning on and off an electrical load device comprising:
   (a) a mounting member;
   (b) a moveable bracket member attached to the mounting member, moveable between a first bracket position (FBP) and a second bracket position (SBP) by an external force, said moveable bracket member further having a first magnetic end and a second magnetic end which define a space therebetween, said first magnetic end and second magnetic end oriented in a repelling arrangement, said moveable bracket member being operatively arranged to change the state of a switch between a first and second state, and
   (c) the switch operably connected to the electrical load device.

2. The control apparatus of claim 1, wherein the switch is normally open in its first state so that the electrical load device is normally off.

3. The control apparatus of claim 2 wherein the electrical load device is a normally off pump which is for use in a pump-down application such that when the switch is in its second state the pump is turned on to maintain a liquid below a predetermined level.

4. The control apparatus of claim 1, wherein the switch is normally closed in its first state so that the electrical load device is normally on.

5. The control apparatus of claim 4 wherein the electrical load device is a normally on pump which is for use in a pump-up application such that when the switch is in its second state the pump is turned off to maintain a liquid above a predetermined level.

6. The control apparatus of claim 1, wherein the switch has an actuating member which has a first actuating position (FAP) and a second actuating position (SAP), which correspond to the first and second states of the switch, respectively.

7. The control apparatus of claim 6, wherein the actuating member is normally in its FAP.

8. The control apparatus of claim 7 wherein the actuating member includes a biasing element having a biasing force which must be overcome to place the actuating element in its SAP.

9. The control apparatus of claim 8, wherein the moveable bracket member further comprises a lever arm which is pivotally attached to the mounting member, such that upon application of a predetermined external force the moveable bracket member moves between its FBP and SBP, so that the lever arm exerts a force on the actuating member sufficient to overcome the biasing force to put the actuating member into its SAP.

10. The control apparatus of claim 9, wherein upon removal of the external force, the biasing force causes the moveable bracket member to move from its SBP to its FBP to place the actuating member into its FAP.

11. The control apparatus of claim 1, wherein the moveable bracket member is constructed and arranged to hold a first magnetic body in the first magnetic end and a second magnetic body in the second magnetic end, the first and second magnetic bodies being oriented in a repelling arrangement.

12. The control apparatus of claim 11 wherein the first and second magnetic ends are constructed and arranged so that the first and second magnetic bodies snap-fit into the first and second magnetic ends.

13. The control apparatus of claim 1 wherein the mounting member is attached to a base.

14. The control apparatus of claim 13 wherein an enclosure is sealingly attached to the base, to house the control apparatus in a fluid-tight environment.

15. The control apparatus of claim 13 wherein the control apparatus is housed in a pump enclosure to provide a fluid-tight environment.

16. The control apparatus of claim 13, in which the base is arranged around a float rod tower which extends vertically above and below the base, the float rod tower being an enclosure with a closed top and open bottom and extends vertically such that the closed top of the float rod tower is a predetermined distance above the bracket and the float rod tower is located in the space defined by the first and second magnetic ends.

17. The control apparatus of claim 16, wherein the float rod tower has a predetermined width and has front and back and first and second sides, the first and second sides each having an outside surface, the first and second magnetic ends of the moveable bracket member each having an inside surface, the moveable bracket member having a range of motion between the FBP and SBP such that in the FBP the inside surface of the first magnetic end abuts the first outside surface of the float rod tower and in the SBP the inside surface of the second magnetic end abuts the second outside surface of the float rod tower.

18. The control apparatus of claim 17 wherein the float rod tower contains a moveable float rod carrying a float rod magnet which has magnetic poles such that one pole of the float rod magnet repels one of the first and second magnetic ends and the other pole attracts the other of the first and second magnet ends, the float rod extending through the open bottom of the float rod tower.

19. The control apparatus of claim 18 wherein the float rod magnet is carried by a float rod magnet carrier which is attached to a top end of the float rod, and further including a float which is arranged around the float rod, the float moveable upwardly and downwardly along the float rod in response to a fluid level, the float engaging the float rod at a predetermined fluid level to raise the float rod magnet carrier in response to a rising fluid level, the rising fluid level moving the float rod magnet carrier upwardly within the float rod tower thereby positioning the float rod magnet to magnetically interact with the first and second magnetic ends of the moveable bracket member, the float rod magnet being magnetically attracted to one of the first and second magnetic ends, and being magnetically repelled by the other of the first and second magnetic ends, the float rod magnet and the first and second magnetic ends creating a force sufficient to move the moveable bracket member from the FBP to the SBP.

20. The control apparatus of claim 19 further including a lower float stop connected to a lower end of the float rod and positioned so that with a predetermined lower level of liquid the float will provide sufficient force, based on its weight, to overcome the interacting force between the float rod magnet and the first and second magnetic ends to cause the float rod to lower so that the float rod magnet does not magnetically interact with the first and second magnetic ends, thereby allowing the biasing force supplied by the biasing member to move the actuating member, lever arm, and bracket back to the FBP.

21. The control apparatus of claim 20 wherein the bottom of the float rod tower is partially obstructed to abut a lower end of the float rod magnet carrier, to prevent the float rod from descending beyond a predetermined amount.

22. The control apparatus of claim 21 wherein the bottom of the float rod tower is partially obstructed by a removable pin which acts as a stop for a shoulder defined by the lower portion of the float rod magnet carrier.

23. The control apparatus of claim 22 wherein the float engages with the float rod at an upper float stop which is adjustable to a predetermined height.

24. The control apparatus of claim 22 wherein the lower float stop is adjustable to a predetermined height.

25. The control apparatus of claim 22 wherein the movement of the moveable bracket member from the FBP to the SBP is performed with a snap-action caused by the increasing magnetic attractive magnetic force.

26. The control apparatus of claim 19 wherein the float is an open-bottom float.

27. The control apparatus of claim 19 wherein the float is a closed bottom float.

28. The control apparatus of claim 1 wherein the electrical load device is an alarm.

29. The control apparatus of claim 1 wherein the electrical load device is a solenoid valve.

30. The control apparatus of claim 1 wherein the electrical load device is a semiconductor device.

31. A control apparatus for turning on and off an electrical load device comprising:
   (a) a mounting member;
   (b) a moveable bracket member attached to the mounting member, moveable between a first bracket position (FBP) and a second bracket position (SBP) by an external force, said moveable bracket member further having a first magnetic end and a second magnetic end which define a space therebetween, said first magnetic end and second magnetic end oriented in a repelling arrangement, said moveable bracket member being operatively arranged to change the state of a switch between a first and second state;
   (c) the switch being operably connected to the electrical load device;
   (d) a moveable float rod carrying a float rod magnet which has magnetic poles such that one pole of the float rod magnet repels one of the first and second magnetic ends and the other pole attracts the other of the first and second magnet ends;
   (e) a float which is arranged around the float rod, the float moveable upwardly and downwardly along the float rod in response to a fluid level, the float engaging the float rod at a predetermined fluid level to raise the float rod magnet in response to a rising fluid level, the rising fluid level moving the float rod magnet upwardly so that the float rod magnet magnetically interact with the first and second magnetic ends of the moveable bracket member, the float rod magnet being magnetically attracted to one of the first and second magnetic ends, and being magnetically repelled by the other of the first and second magnetic ends, the float rod magnet and the first and second magnetic ends creating a force sufficient to move the moveable bracket member from the FBP to the SBP.

32. The control apparatus of claim 31, wherein the switch is normally open in its first state so that the electrical load device is normally off.

33. The control apparatus of claim 32 wherein the electrical load device is a normally off pump which is for use in a pump-down application such that when the switch is in its second state the pump is turned on to maintain a liquid below a predetermined level.

34. The control apparatus of claim 31, wherein the switch is normally closed in its first state so that the electrical load device is normally on.

35. The control apparatus of claim 34 wherein the electrical load device is a normally on pump which is for use in a pump-up application such that when the switch is in its second state the pump is turned off to maintain a liquid above a predetermined level.

36. The control apparatus of claim 31, wherein the switch has an actuating member which has a first actuating position (FAP) and a second actuating position (SAP), which correspond to the first and second states of the switch, respectively.

37. The control apparatus of claim 36, wherein the actuating member is normally in its FAP.

38. The control apparatus of claim 37 wherein the actuating member includes a biasing element having a biasing force which must be overcome to place the actuating element in its SAP.

39. The control apparatus of claim 38, wherein the moveable bracket member further comprises a lever arm which is pivotally attached to the mounting member, such that upon application of a predetermined external force the moveable bracket member moves between its FBP and SBP, so that the lever arm exerts a force on the actuating member sufficient to overcome the biasing force to put the actuating member into its SAP.

40. The control apparatus of claim 39, wherein upon removal of the external force, the biasing force causes the moveable bracket member to move from its SBP to its FBP to place the actuating member into its FAP.

41. The control apparatus of claim 31, wherein the moveable bracket member is constructed and arranged to hold a first magnetic body in the first magnetic end and a second magnetic body in the second magnetic end, the first and second magnetic bodies being oriented in a repelling arrangement.

42. The control apparatus of claim 41 wherein the first and second magnetic ends are constructed and arranged so that the first and second magnetic bodies snap-fit into the first and second magnetic ends.

43. The control apparatus of claim 31 wherein the mounting member is attached to a base.

44. The control apparatus of claim 43 wherein an enclosure is sealingly attached to the base, to house the control apparatus in a fluid-tight environment.

45. The control apparatus of claim 43 wherein the control apparatus is housed in a pump enclosure to provide a fluid-tight environment.

46. The control apparatus of claim 43, in which the base is arranged around a float rod tower which extends vertically above and below the base, the float rod tower being an enclosure with a closed top and open bottom and extends vertically such that the closed top of the float rod tower is a predetermined distance above the bracket and the float rod tower is located in the space defined by the first and second magnetic ends.

47. The control apparatus of claim 46, wherein the float rod tower has a predetermined width and has front and back and first and second sides, the first and second sides each having an outside surface, the first and second magnetic ends of the moveable bracket member each having an inside surface, the moveable bracket member having a range of motion between the FBP and SBP such that in the FBP the inside surface of the first magnetic end abuts the first outside surface of the float rod tower and in the SBP the inside surface of the second magnetic end abuts the second outside surface of the float rod tower, the float rod tower receiving the moveable float rod, carrying the float rod magnet.

48. The control apparatus of claim 47 further including a lower float stop connected to a lower end of the float rod and positioned so that with a predetermined lower level of liquid the float will provide sufficient force, based on its weight, to overcome the interacting force between the float rod magnet and the first and second magnetic ends to cause the float rod to lower so that the float rod magnet does not magnetically interact with the first and second magnetic ends, thereby allowing the biasing force supplied by the biasing member to move the actuating member, lever arm, and bracket back to the FBP.

49. The control apparatus of claim 48 wherein the float rod magnet is carried by a float rod magnet carrier which is attached to a top end of the float rod and wherein the bottom of the float rod tower is partially obstructed to abut a lower end of the float rod magnet carrier, to prevent the float rod from descending beyond a predetermined amount.

50. The control apparatus of claim 49 wherein the bottom of the float rod tower is partially obstructed by a removable pin which acts as a stop for a shoulder defined by the lower portion of the float rod magnet carrier.

51. The control apparatus of claim 50 wherein the float engages with the float rod at an upper float stop which is adjustable to a predetermined height.

52. The control apparatus of claim 48 wherein the lower float stop is adjustable to a predetermined height.

53. The control apparatus of claim 48 wherein the movement of the moveable bracket member from the FBP to the SBP is performed with a snap-action caused by the increasing magnetic attractive magnetic force.

54. The control apparatus of claim 31 wherein the float is an open-bottom float.

55. A method of actuating a switch comprising the steps of:
(a) supplying a switch that is operably connected to a moveable bracket member by an actuating member, said bracket having a first magnetic end and a second magnetic end which define a space therebetween, said magnetic ends positioned in a repelling arrangement;
(b) inserting a float rod magnet into the space between the first magnetic body and the second magnetic body, thereby causing an attraction between one of the first and second magnetic bodies and the float rod magnet and a repulsion between the other of the first and second magnetic body and the float rod magnet;
(c) moving the bracket as a result of a cumulative attracting and repelling forces between the float rod magnet and the first and second magnetic bodies; and
(d) actuating the switch from a first state to a second state as a result of the movement of the bracket.

56. The method of claim 55, wherein moving the bracket is accomplished with a snapaction.

57. The method of claim 55 further comprising the step of actuating the switch from the second position to the first position by removing the float rod magnet from the space between the first magnetic end and the second magnetic end of the moveable bracket member.

58. The method of claim 57 wherein the float rod magnet is mounted to an upper portion of a moveable float rod, the float rod having an upper float stop and a lower float stop, a float being disposed about the float rod and capable of movement upwardly or downwardly along the float rod between the upper float stop and the lower float stop, said movement being in response to a changing fluid level.

59. The method of claim 58 wherein the float engages the upper float stop thereby upwardly moving the float rod and float rod magnet into the space between the first magnetic end and the second magnetic end of the moveable bracket member.

60. The method of claim 59 wherein the float engages the lower float stop thereby moving the float rod and float rod magnet downwardly out of the space between the first magnetic end and the second magnetic end of the moveable bracket member.

* * * * *